(12) United States Patent
Jun et al.

(10) Patent No.: US 12,314,199 B2
(45) Date of Patent: May 27, 2025

(54) ELECTRONIC DEVICE FOR PROCESSING DATA AND METHOD THEREOF

(71) Applicant: Samsung Electronics Co., Ltd., Suwon-si (KR)

(72) Inventors: Intae Jun, Suwon-si (KR); Jiwoo Lee, Suwon-si (KR); Cheoleun Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/171,025

(22) Filed: Feb. 17, 2023

(65) Prior Publication Data

US 2023/0205714 A1 Jun. 29, 2023

Related U.S. Application Data

(63) Continuation of application No. PCT/KR2022/011964, filed on Aug. 11, 2022.

(30) Foreign Application Priority Data

Oct. 6, 2021 (KR) .................... 10-2021-0132566

(51) Int. Cl.
*G06F 13/24* (2006.01)
(52) U.S. Cl.
CPC .................... *G06F 13/24* (2013.01)
(58) Field of Classification Search
CPC ...................................................... G06F 13/24
See application file for complete search history.

(56) References Cited

U.S. PATENT DOCUMENTS 7,142,897 B2 11/2006 Kim et al.
7,143,202 B2 11/2006 Tehrani et al.
(Continued)

FOREIGN PATENT DOCUMENTS

CN 102880576 A 1/2013
KR 10-0374461 B1 3/2003
(Continued)

OTHER PUBLICATIONS

European Search Report dated Oct. 30, 2024, issued in European Application No. 22878702.4.

*Primary Examiner* — Henry Tsai
*Assistant Examiner* — Harry Z Wang
(74) *Attorney, Agent, or Firm* — Jefferson IP Law, LLP

(57) ABSTRACT

An electronic device is provided. The electronic device includes a display, a first data interface circuit including a port for connecting with an external device, and configured to exchange serial data with the external device, at least one processor operatively connected with the first data interface circuit, and a memory operatively connected with the at least one processor, the memory stores instructions that cause the at least one processor to allocate a plurality of input/output ports for processing serial data received from the first data interface circuit in parallel, and receive a first signal from the external device through the first data interface circuit, in response to the first signal being received, identify a port set to be in an active state among the plurality of input/output ports, identify the first signal by using the port that is identified as being in the active state, and display information.

22 Claims, 13 Drawing Sheets

(56) References Cited

U.S. PATENT DOCUMENTS

| | | |
|---|---|---|
| 7,248,597 B2 | 7/2007 | Kim |
| 7,424,312 B2 | 9/2008 | Pinder et al. |
| 7,865,629 B1 | 1/2011 | Tantos et al. |
| 9,063,751 B2 | 6/2015 | Grewal et al. |
| 9,098,304 B2 | 8/2015 | Young et al. |
| 9,389,772 B2 | 7/2016 | Chun |
| 10,284,694 B2 | 5/2019 | Chapman |
| 2005/0075133 A1 | 4/2005 | Pinder et al. |
| 2007/0099592 A1* | 5/2007 | Thome ................. H04B 1/3877 455/348 |
| 2009/0276546 A1 | 11/2009 | Lui et al. |
| 2012/0233374 A1 | 9/2012 | Whitefield et al. |
| 2012/0331194 A1* | 12/2012 | Crumlin ............. G06F 13/4045 710/110 |
| 2013/0179609 A1 | 7/2013 | Bhesania et al. |
| 2013/0282937 A1* | 10/2013 | Chapman ................ H02J 7/342 710/104 |
| 2013/0336334 A1* | 12/2013 | Gilbert ..................... H04J 3/16 370/458 |
| 2015/0301979 A1* | 10/2015 | Mishra ................ G06F 13/4022 710/106 |
| 2017/0123474 A1* | 5/2017 | Tang ..................... G06F 3/0383 |
| 2017/0185100 A1* | 6/2017 | Nguyen ................ G06F 1/3206 |
| 2018/0034661 A1 | 2/2018 | Zhou et al. |
| 2018/0189210 A1 | 7/2018 | Ambühl |
| 2019/0026240 A1* | 1/2019 | Sachidanandam ...... G06F 13/36 |
| 2019/0197010 A1 | 6/2019 | Tian et al. |
| 2019/0334362 A1 | 10/2019 | Sheng et al. |

FOREIGN PATENT DOCUMENTS

| | | |
|---|---|---|
| KR | 10-0547728 B1 | 1/2006 |
| KR | 10-0841544 B1 | 6/2008 |
| KR | 10-2010-0090946 A | 8/2010 |
| KR | 10-2013-0057074 A | 5/2013 |
| WO | 2005/076144 A2 | 8/2005 |
| WO | 2020/251546 A1 | 12/2020 |

\* cited by examiner

ELECTRONIC DEVICE FOR PROCESSING DATA AND METHOD THEREOF

CROSS-REFERENCE TO RELATED APPLICATION(S)

This application is a continuation application, claiming priority under § 365(c), of an International application No. PCT/KR2022/011964, filed on Aug. 11, 2022, which is based on and claims the benefit of a Korean patent application number 10-2021-0132566, filed on Oct. 6, 2021, in the Korean Intellectual Property Office, the disclosure of which is incorporated by reference herein in its entirety.

TECHNICAL FIELD

The disclosure relates to an electronic device which processes input and output data associated with an external device, and a method thereof.

BACKGROUND ART

With the development of information and communication technology and semiconductor technology, electronic devices (for example, smartphones, tablet devices) are gradually becoming smaller and lighter, whereas functions and services provided by electronic devices are becoming more diversified. For example, an electronic device may provide various useful functions to a user through various applications. Recently, an electronic device supports more various functions by interlocking with a mountable/dismountable accessory device like a keyboard book cover, so that efficiency of the electronic device is enhanced and user's demand is satisfied.

The above information is presented as background information only to assist with an understanding of the disclosure. No determination has been made, and no assertion is made, as to whether any of the above might be applicable as prior art with regard to the disclosure.

DISCLOSURE

Technical Problem

When an electronic device interlocks with an accessory device (for example, a keyboard book cover), the electronic device may be connected with an interface of the accessory device in a 1-wire communication method to perform data communication. The electronic device may interpret 1-wire communication data by using a chip of a micro controller unit (MCU) type mounted therein, and may transmit the data to a processor (for example, an application processor (AP)) in an inter-integrated circuit (I2C) or serial peripheral interface (SPI) communication method. In this process, since the MCU operates every time data is transmitted, power consumption may occur and an overall component cost may increase due to the use of the MCU chip. To solve this problem, a method for implementing a general purpose input/output (GPIO) low/high input/output signal of the processor in a 1-wire format (for example, GPIO bit banging) has been proposed. However, in this case, communication may not normally be performed due to a timing error which may occur when a signal is encoded/decoded in a multi-thread environment. In addition, a method of setting to lock resources of a processor while an electronic device exchanges data with an accessory device may be considered. However, in this case, other processes may not be processed while locking of resources is set, and accordingly, overall system performance of the electronic device may be degraded.

Aspects of the disclosure are to address at least the above-mentioned problems and/or disadvantages and to provide at least the advantages described below. Accordingly, an aspect of the disclosure, when an accessory device is mounted and used in an electronic device, is to provide a 1-wire communication method which may be implemented without adding a separate chip such as a field programmable gate array (FPGA) or a micro controller unit (MCU), so that power consumption occurring during a communication process and a component cost may be reduced.

Another aspect of the disclosure is to provide data input to and output from the accessory device which may be processed by using an interface which is allocated an independent clock channel regardless of an external environment, so that a time sync error in a data communication process or resource occupancy by a processor may be prevented, and system performance may be maintained.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, a first data interface circuit including a port for connecting with an external device, and configured to exchange serial data with the external device, at least one processor operatively connected with the first data interface circuit, and a memory operatively connected with the at least one processor, and, when being executed, the memory may stores instructions that cause the at least one processor to allocate a plurality of input/output ports (e.g., GPIOs) for processing serial data received from the first data interface circuit in parallel, and receive a first signal from the external device through the first data interface circuit, in response to the first signal being received, identify a port that is set to be in an active state among the plurality of input/output ports, identify the first signal by using the port that is identified as being in the active state, and display information corresponding to a result of the identifying on the display.

In accordance with another aspect of the disclosure, an operating method of an electronic device is provided. The operating method includes allocating a plurality of input/output ports (e.g., GPIOs) for processing serial data acquired from a first data interface circuit in parallel, and receiving a first signal from an external device through the first data interface circuit, in response to the first signal being received, identifying a port that is set to be in an active state among the plurality of input/output ports, identifying the first signal by using the port that is identified as being in the active state, and displaying information corresponding to a result of the identifying on a display.

Advantageous Effects

According to various embodiments of the disclosure, when an accessory device (for example, a keyboard book cover) is mounted and used in an electronic device (for example, a smartphone, a tablet device), a 1-wire communication method may be implemented without adding a separate hardware configuration, so that power consumption occurring during a communication process and a component cost may be reduced. In addition, data input to and output from the accessory device may be processed by using an interface which is allocated an independent clock channel regardless of an external environment, so that a time sync error in a data communication process or resource occupancy by a processor may be prevented, and system performance may be maintained.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
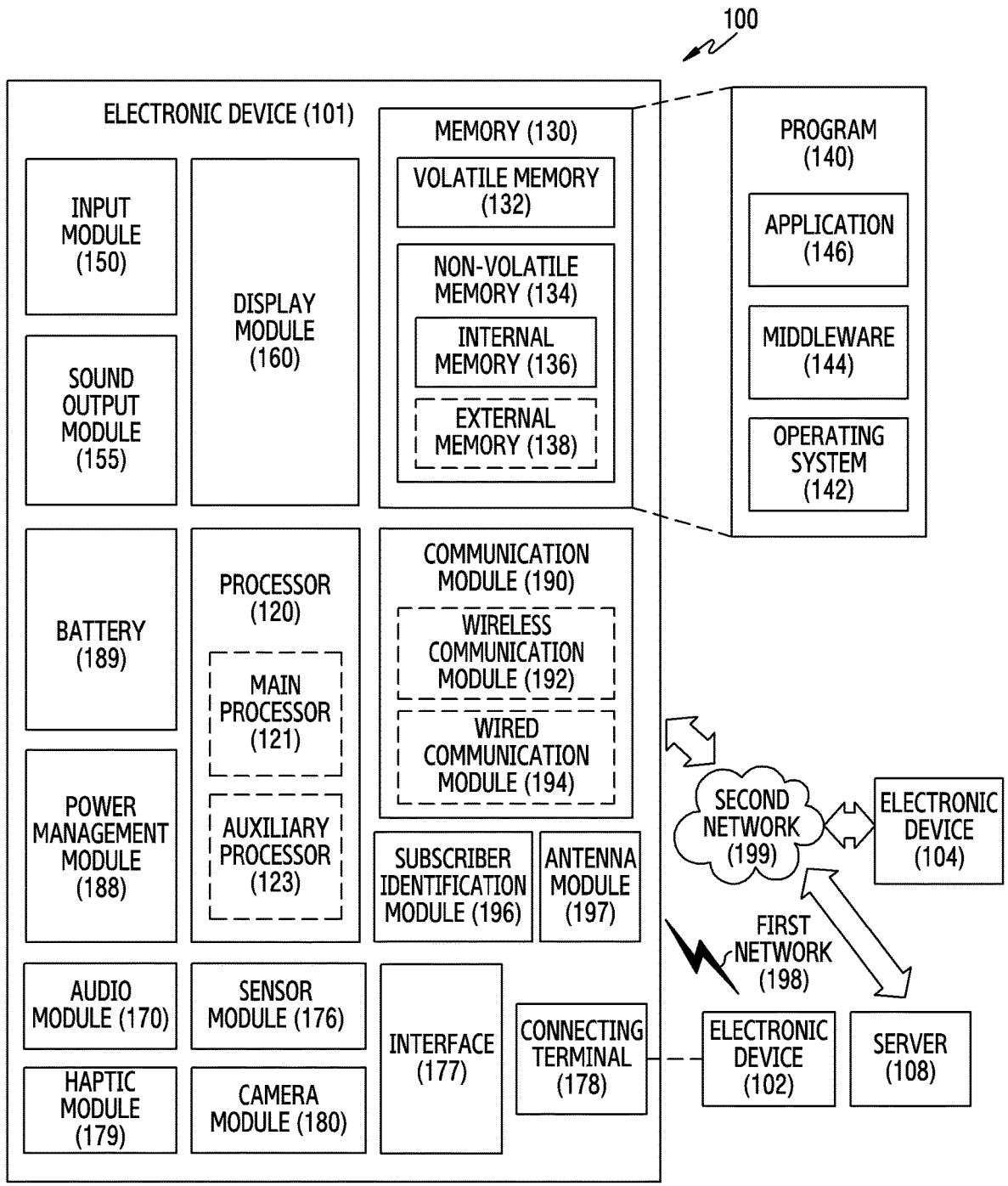
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO) port, serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
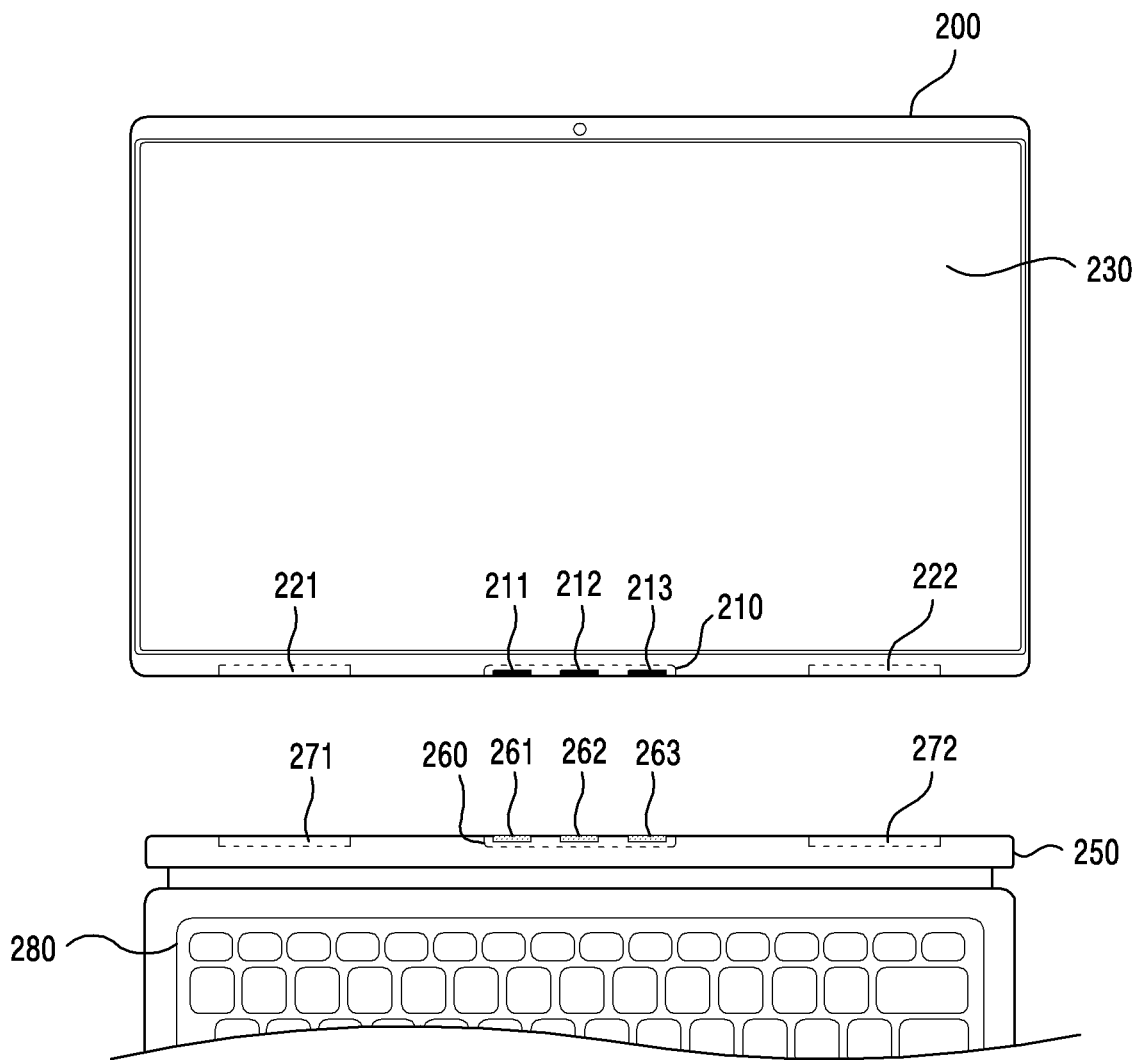
FIGS. 2A and 2B are views to explain a connection structure between an electronic device and an external device according to various embodiments of the disclosure.
Figure 2B:
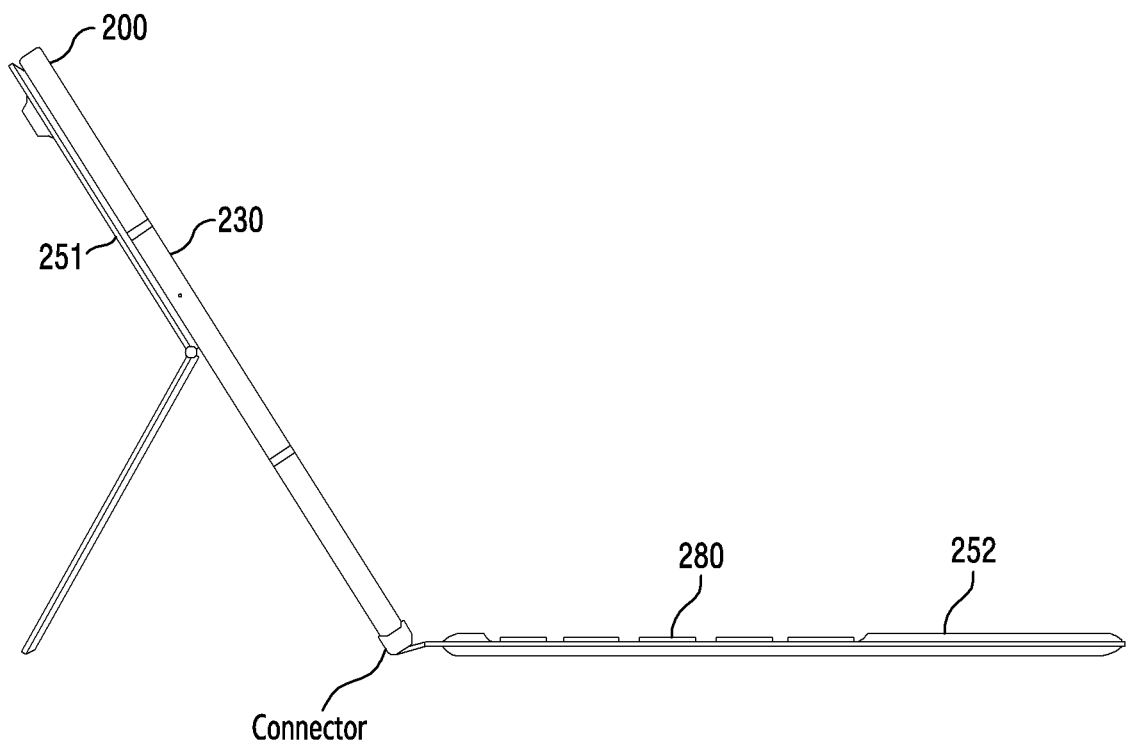

FIGS. 2A and 2B are views to explain a connection structure between an electronic device and an external device according to various embodiments of the disclosure.

Referring to FIGS. 2A and 2B, an electronic device 200 may provide more various functions by interlocking with an external device 250. For example, the external device 250 may be an accessory device such as a keyboard book cover including a keyboard function and/or a touch pad function.

Referring to FIGS. 2A, the electronic device 200 may include a data interface 210, a magnet 221, 222, or a display 230. According to various embodiments, the data interface 210 may be a serial data interface of a POGO type, and may include one or more POGO connectors 211, 212, 213. In an embodiment, the magnet 221, 222 may be for supporting connection with the external device 250 by using magnetic forces, and may be disposed on a side surface of the electronic device 200 that is connected with the external device 250. For example, when the electronic device 200 is connected with the external device 250 through the data interface 210, the electronic device 200 may securely maintain the connection with the external device 250 by using the magnet 221, 222, and may prevent the external device 250 from being dismounted irrespective of a user intention. In an embodiment, the display 230 may display information corresponding to a user input acquired from the external device 250 when connecting with the external device 250. For example, when the electronic device 200 receives user input data from the external device 250 through the data interface 210, the electronic device 200 may convert the user input data into visual information that may be understood by a user, and may output the information on the display 230.

According to an embodiment, the external device 250 may include a data interface 260 or a magnet 271, 272 to connect to the electronic device 200. The data interface 260 may be disposed on a position which comes into contact with the data interface 210 of the electronic device 200 in order to connect to the electronic device 200. According to various embodiments, the data interface 260 may be a serial data interface of a POGO type, and may include one or more POGO connectors 261, 262, 263. In an embodiment, the magnet 271, 272 may support connection with the electronic device 200 by using magnetic forces, and may be disposed on a position which comes into contact with the magnet 221, 222 of the electronic device 200. According to various embodiments, the external device 250 may include a keyboard 280 and/or a touch pad (not shown) as a way for acquiring a user input.

According to an embodiment, the electronic device 200 may be coupled with the external device 250 as shown in FIG. 2B. For example, the electronic device 200 may be connected with the external device 250 by using the POGO connectors 211, 212, 213, and connection between the two devices may be securely maintained through the magnet 221, 222 of the electronic device 200 and the magnet 271, 272 of the external device 250. According to various embodiments, the external device 250 may be divided into a back cover 251 and a front cover 252. In this case, the front cover 252 may maintain the connection state with the electronic device 200 through the connectors 261, 262, 263, and the back cover 251 may be attached to a display rear surface of the electronic device 200. In an embodiment, the back cover 251 may be folded by various angles according to a user operation, and, when the back cover 251 is folded, the electronic device 200 may be supported to maintain a standing state. In an embodiment, the front cover 252 may include the keyboard 280 and/or the touch pad (not shown), and user input data acquired from the input circuitry may be transmitted to the electronic device 200 through the connectors 261, 262, 263. The electronic device 200 may display information corresponding to the user input data received from the front cover 252 of the external device 250 on the display 230.

Figure 3A:
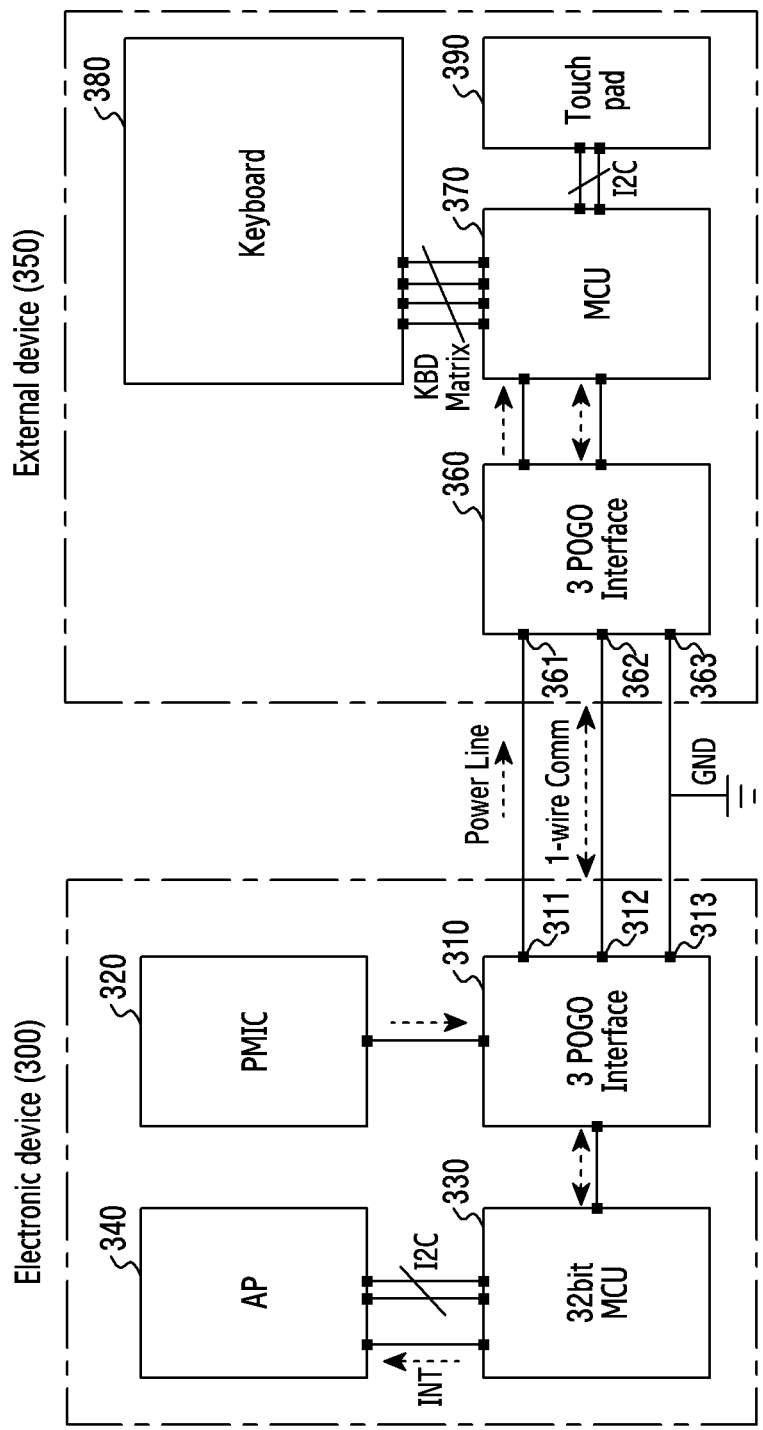
FIGS. 3A and 3B are views to explain a method of interlocking with an external device in an electronic device according to various embodiments of the disclosure.
Figure 3B:
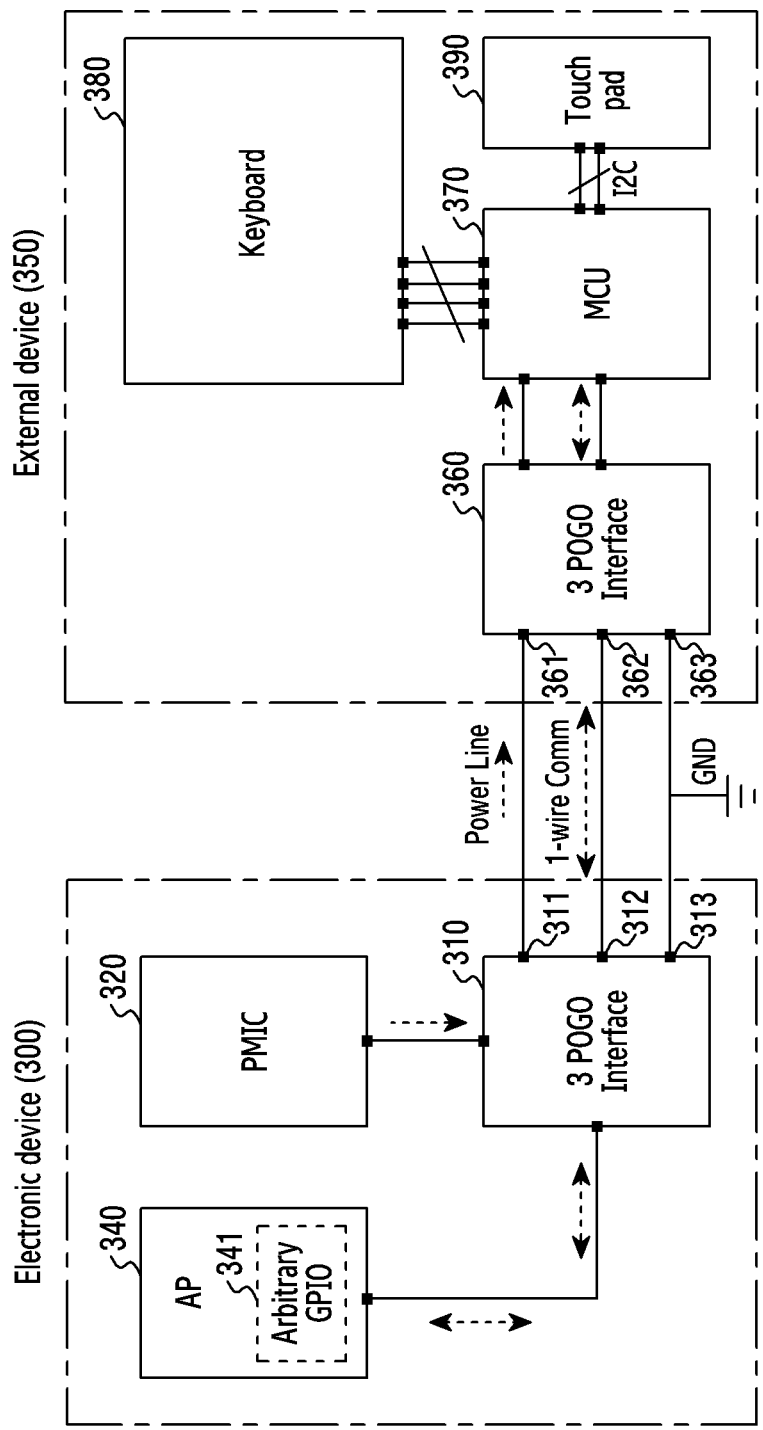

FIGS. 3A and 3B are views to explain a method of interlocking with an external device in an electronic device according to various embodiments of the disclosure.

According to various embodiments, in the case of an external device (for example, a keyboard book cover) which is directly connected with the electronic device 300 and is used, a serial data interface supporting a 1-wire communication method may be used. For example, the serial data interface may be a POGO interface including a 3-pin POGO connector, but is not limited thereto, and various interfaces may be utilized. When being connected with each other through the serial data interface, the electronic device 300 and the external device 250 may operate as a master device and a slave device, respectively.

Referring to FIG. 3A, an electronic device 300 may include a 3-POGO interface 310, a power management integrated circuit (PMIC) 320, an MCU 330, or an application processor (AP) 340. The external device 350 may include a 3-POGO interface 360, an MCU 370, a keyboard 380, or a touch pad 390.

In the comparison example, the electronic device 300 may be connected with the external device 350 through the 3-POGO interface 310. For example, the 3-POGO interface 310 of the electronic device 300 may include three POGO connectors 311, 312, 313, and the 3-POGO interface 360 of the external device 350 may include three POGO connectors 361, 362, 363. A first connector 311 may be for supplying power to the external device 350 and may come into contact with the first connector 361 of the external device 350. When the first connector 311 comes into contact with a first connector 361 of the external device 350, the first connector 311 may deliver power supplied from the PMIC 320 to the external device 350. A second connector 312 may be for performing data communication with the external device 350, and may come into contact with a second connector 362 of the external device 350. A third connector 313 may be for grounding, and may come into contact with a third connector 363 of the external device 350.

In the comparison example, the external device 350 may acquire user input data from the keyboard 380 or the touch pad 390. For example, the external device 350 may acquire key input data of a user through the keyboard 380 or may acquire coordinates data corresponding to a user input of the user through the touch pad 390. The external device 350 may encode the user input data by using the MCU 370, and may transmit the encoded data to the electronic device 300 through the second connector 362 of the 3-POGO interface 360.

In the comparison example, the electronic device 300 may receive the encoded user input data from the external device 350 through the second connector 312 of the 3-POGO interface 310. The electronic device 300 may decode the user input data by using the MCU 330, and may transmit the decoded data to the AP 340 in an inter-integrated circuit (I2C) communication method. In FIG. 3A, the MCU 330 should operate every time in order for the electronic device 300 to receive data from the external device 350, and power consumption resulting therefrom may cause a burden in power management of the electronic device 300, and there may be a problem that a component cost increases according to use of an MCU chip.

Referring to FIG. 3B, an electronic device 300 may include a 3-POGO interface 310, a PMIC 320, or an application processor (AP) 340. The external device 350 may include a 3-POGO interface 360, a 32-bit MCU 370, a keyboard 380, or a touch pad 390.

In the comparison example, the electronic device 300 may be connected with the external device 350 through the 3-POGO interface 310 as in FIG. 3A. For example, a first connector 311 may be for supplying power to the external device 350, and may come into contact with a first connector 361 of the external device 350. A second connector 312 may be for performing data communication with the external device 350, and may come into contact with a second connector 362 of the external device 350. A third connector 313 may be for grounding, and may come into contact with a third connector 363 of the external device 350.

In the comparison example, when the electronic device 300 is connected with the external device 350 through the 3-POGO interface 310, the electronic device 300 may transmit power supplied from the PMIC 320 to the external device 350 by using the first connector 311. The electronic device 300 may receive user input data from the external device 350 through the second connector 312 of the 3-POGO interface 310. In FIG. 3B, the electronic device 300 may implement a GPIO bit banging method with software in order to process the user input data. For example, the AP 340 of the electronic device 300 may encode or decode data by allocating resources by using a low/high input/output signal of an arbitrary GPIO 341. In this case, when a signal is encoded/decoded in a multi-thread environment such as Linux or Windows, a timing error may occur due to a work load of a system, and there may be a problem that communication is not normally performed between two devices due to the timing error. In another example, the AP 340 of the electronic device 300 may set resource locking while exchanging data with the external device 350. In this case, since a corresponding AP resource may not process other processes while the resource locking is set, there may be a problem that overall system performance of the electronic device 300 is degraded.

Figure 4:
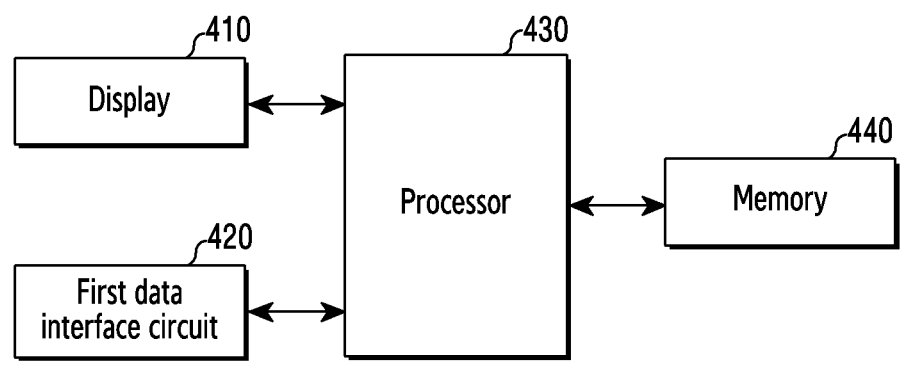
FIG. 4 is a block diagram illustrating a configuration of an electronic device according to an embodiment of the disclosure.

FIG. 4 is a block diagram illustrating a configuration of an electronic device according to an embodiment of the disclosure.

Referring to FIG. 4, an electronic device 400 may be a device that is connected with an external device (for example, an electronic device 102, 104 of FIG. 1, or an external device 250 of FIG. 2A) and processes input/output data, and may include a display 410, a first data interface circuit 420, a processor 430, or a memory 440. In FIG. 4, the electronic device 400 may correspond to the electronic device 101 shown in FIG. 1, or the electronic device 200 shown in FIGS. 2A and 2B.

In an embodiment, the display 410 (for example, the display module 160 of FIG. 1) may display information corresponding to a signal acquired from the external device. For example, the display 410 may display information related to a state of connection with the external device. In another example, the display 410 may display keyboard key input information inputted from the external device or information corresponding to a touch input on a touch pad.

In an embodiment, the display 410 may be configured by at least one of a liquid crystal display (LCD), a thin film transistor (TFT) LCD, organic light emitting diodes (OLED), a light emitting diode (LED), an active matrix organic LED (AMOLED), a flexible display, and a three-dimension display. In addition, some of these displays may be configured in a transparent type or a light-transmitting type so as to allow a user to see the outside therethrough. The display may be configured in the form of a transparent display including a transparent OLED (TOLED).

In an embodiment, the first data interface circuit 420 may be a serial data interface that provides connection with the external device to transmit and receive data therethrough. According to various embodiments, the first data interface circuit 420 may include one or more POGO pin connectors to be connected with the external device. For example, the first data interface circuit 420 may include a pogo connector of a 3-pin type, and in this case, three pogo connectors may be divided into a first connector for supplying power, a second connector for transmitting and receiving data, or a third connector for grounding. According to various embodiments, the connector of the first data interface circuit 420 is not limited to the POGO connector, and may include various types of connectors connectable with the external device.

In an embodiment, when being executed, the memory 440 (for example, the memory 130 of FIG. 1) may store instructions that control at least one processor 430 (for example, the processor 120 of FIG. 1) to perform various operations. For example, the at least one processor 430 may perform operations of detecting connection with the external device and processing input/output data.

In an embodiment, the at least one processor 430 may allocate a plurality of input output ports for processing serial data acquired in the first data interface circuit 420 in parallel. According to various embodiments, the plurality of input/output ports may be configured in a GPIO pin type to control an input or output operation of data according to a design purpose.

In an embodiment, the at least one processor 430 may receive a first signal from the external device through the first data interface circuit 420. According to various embodiments, when the external device is connected through the first data interface circuit 420, the at least one processor 430 may receive the first signal by using a connector for transmitting and receiving data among the one or more pogo connectors included in the first data interface circuit 420. The first signal may be an interrupt signal generated in the external device in response to connection between the electronic device 200 and the external device, or may include user input data inputted through the external device.

In an embodiment, the at least one processor 430 may identify a port that is set to be in an active state among the plurality of input/output ports, in response to the first signal being received. The at least one processor 430 may process the first signal in a different method according to which port of the plurality of input/output ports is in the active state.

In an embodiment, the at least one processor 430 may identify the first signal by using the port that is identified as being in the active state. For example, when it is identified that a first port for interrupt-processing among the plurality of input/output ports is in the active state, the at least one processor 430 may identify the first signal as an interrupt signal generated in the external device. When the first signal is identified as the interrupt signal, the at least one processor 430 may recognize that the external device is connected. According to various embodiments, when the at least one processor 430 recognizes that connection with the external device is successfully set, the at least one processor 430 may change a state set for the plurality of input/output ports. The at least one processor 430 may set a second port for receiving data among the plurality of input/output ports to go into an active state, instead of changing the first port to go into an inactive state.

In another example, when the second port for receiving data among the plurality of input/output ports is identified as being in an active state, the at least one processor 430 may identify that the first signal is an input signal inputted to the external device by a user. The input signal may include at least one of key input data which is inputted by using a keyboard of the external device, or touch data which is inputted by using the touch pad of the external device. According to various embodiments, the at least one processor 430 may process the first signal by using a universal asynchronous receiver/transmitter (UART) interface. In this case, the at least one processor 430 may process the first signal by using a receiver of the UART. The at least one processor 430 may identify input data of a user from the first signal, and may convert the input data into information (for example,) of a form that may be provided to the user (for example, visual, auditory or tactual information).

According to various embodiments, the at least one processor 430 may identify that a signal is not received from the external device for a designated time while the second port is set to be in the active state. In this case, the at least one processor 430 may change the second port to go into an inactive state, and may set the first port to go into an active state.

In an embodiment, the at least one processor 430 may control to display information corresponding to a result of identifying the first signal on the display 410. For example, when the first signal is identified as an interrupt signal generated in the external device, the at least one processor 430 may display information indicating that the electronic device is connected with the external device on the display 410. In another example, when the first signal is identified as an input signal inputted to the external device by a user, the at least one processor 430 may display information corresponding to input data (for example, key input data of the keyboard or touch input data of the touch pad) included in the input signal on the display 410. According to various embodiments, the at least one processor 430 may provide the information to the user by using at least one output of a speaker (for example, the sound output module 155 of FIG. 1) or a vibration generation module (for example, the haptic module 179 of FIG. 1).

In an embodiment, the at least one processor 430 may identify whether it is necessary to update for the external device. For example, the at least one processor 430 may detect an event for updating firmware of an MCU chip or an internal circuit included in the external device, or may identify whether information related to the updating occurs at designated intervals. In another example, the at least one processor 430 may identify whether updating for the external device is performed, based on a user request. When it is identified that it is necessary to update for the external device, the at least one processor 430 may change a port currently set to be in an active state to go into an inactive state, and may set a third port for transmitting data among the plurality of input/output ports to go into an active state. According to various embodiments, the at least one processor 430 may process information related to updating of the external device, by using the universal asynchronous receiver/transmitter (UART) interface. In this case, the at least one processor 430 may transmit the information related to the updating of the external device to the third port by using a transmitter of the UART. The at least one processor 430 may transmit the information related to the updating to the first data interface circuit 420 by using the third port, and may transmit the information related to the updating to the external device through the first data interface circuit 420. According to various embodiments, when it is identified that it is not necessary to update for the external device, the at least one processor 430 may maintain the active state of the second port.

According to various embodiments, the at least one processor 430 may allocate an independent clock channel to the UART by using a clock management unit (CMU). To this end, the at least one processor 430 may control the UART to receive or transmit data stably regardless of an external environment or a system work load.

Figure 5:
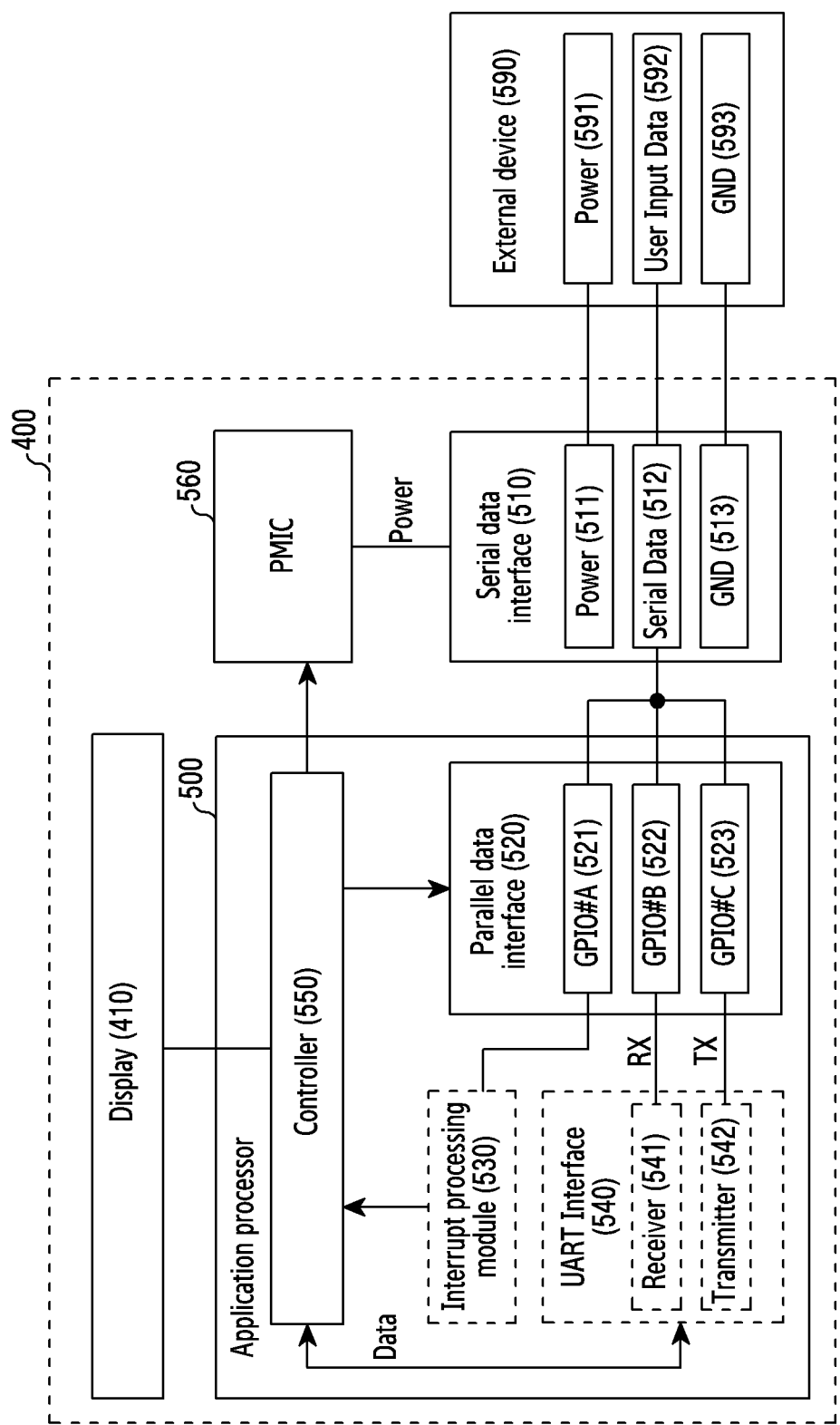
FIG. 5 is a view to explain a detailed configuration of an electronic device according to an embodiment of the disclosure.

FIG. 5 is a view illustrating a detailed configuration of an electronic device according to an embodiment of the disclosure.

Functions or operations which will be described with reference to FIG. 5 may be understood as functions performed by the at least one processor 430 of the electronic device 400 of FIG. 4. The at least one processor 430 may execute instructions stored in the memory 440 to implement software modules illustrated by dashed lines in FIG. 5, and may control hardware associated with functions (for example, a display 410, a serial data interface 510, a parallel data interface 520, a controller 550, or a PMIC 560). According to various embodiments, the electronic device 400 is not limited to the components illustrated in FIG. 5, and may additionally include a component corresponding to a function required in the electronic device 400 among the components illustrated in FIG. 1.

Referring to FIG. 5, an electronic device 400 may include an application processor 500, a serial data interface 510, a PMIC 560, or a display 410. According to various embodiments, the application processor 500 may correspond to the at least one processor 430 shown in FIG. 4, and may include a parallel data interface 520, an interrupt processing module 530, a UART interface 540, or a controller 550.

In an embodiment, the serial data interface 510 may be a configuration module for providing connection with an external device 590 and transmitting and receiving data, and may include one or more connectors 511, 512, 513 directly connected with the external device 590. The external device 590 may be an accessory device (for example, a keyboard book cover) which is mountable/dismountable through the serial data interface 510. According to various embodiments, the serial data interface 510 may be a POGO interface including a 3-pin POGO connector. In this case, three connectors included in the serial data interface 510 may be divided into a first connector 511 for supplying power, a second connector 512 for processing data, or a third connector 513 for grounding. To correspond to the configuration of the serial data interface 510, a data interface of the external device 590 may include a 3-pin POGO connector. When the electronic device is connected with the external device 590 through the serial data interface 510, the first connector 511 may come into contact with a first connector 591 of the external device 590 to transmit power supplied from the PMIC 560 to the external device 590. The second connector 512 may come into contact with a second connector 592 of the external device 590 to perform data communication with the external device 590. The third connector 513 may be grounded in contact with a third connector 593 of the external device 590. According to various embodiments, the serial data interface 510 is not limited to a POGO interface and may include various types of interfaces.

In an embodiment, the application processor 500 may set an operation mode of the parallel data interface 520 according to an interlocking state between the electronic device 400 and the external device 590. According to various embodiments, the parallel data interface 520 may include a plurality of GPIO pins for processing input/output data associated with the external device 590 in parallel. The application processor 500 may process data differently according to an operation mode set for the parallel data interface 520.

In an embodiment, when the external device 590 is not connected through the serial data interface 510, the controller 550 may set the operation mode of the parallel data interface 520 to a first mode. In the first mode, the controller 550 may set only an A port 521 among the plurality of GPIO ports included in the parallel data interface 520 to be in an active state, and may set the other ports 522, 523 to be in an inactive state. For example, the controller 550 may set the active state by controlling the A port 521 to go into a pull-up or pull-down state. In another example, the controller 550 may set the inactive state by controlling the other ports 522, 523 to go into a physically open circuit state. According to various embodiments, when there is no input signal for a designated time after the external device 590 is mounted through the serial data interface 510, the controller 550 may set the operation mode of the parallel data interface 520 to the first mode.

In an embodiment, the parallel data interface 520 may acquire an interrupt signal received from the external device 590 through the second connector 512 of the serial data interface 510 during the first mode. According to various embodiment, when the external device 590 is connected with the electronic device 400 through the serial data interface 510, the external device 590 may artificially generate an interrupt signal or may transmit data initially inputted by a user after connecting to the electronic device 400 to the electronic device 400 as an interrupt signal. The parallel data interface 520 may transmit the interrupt signal to the interrupt processing module 530 by using the A port 521 which is in the active state among the plurality of ports. The interrupt processing module 530 may transmit, to the controller 550, first information indicating that the electronic device is connected with the external device 590 based on the interrupt signal (or information indicating that an initial input is generated after being connected with the external device 590). The controller 550 may recognize that the electronic device is connected with the external device 590 based on the first information, and may display information related to the connection on the display 410. According to various embodiments, when it is recognized that the electronic device is connected with the external device 590, the controller 550 may set (change) the operation mode of the parallel data interface 520 to a second mode for receiving data from the external device 590. When the operation mode of the parallel data interface 520 is changed to the second mode, the controller 550 may set only a B port 522 among the plurality of GPIO ports included in the parallel data interface 520 to go into an active state, and may set the other ports 521, 523 to go into an inactive state. For example, the controller 550 may set the active state by controlling the B port 522 to go into a pull-up or pull-down state. In another example, the controller 550 may set the inactive state by controlling the other ports 521, 523 to go into a physically open circuit state. The controller 550 may control the B port 522 of the parallel data interface 520 which is set to be in the active state to be connected with a receiver 541 of the UART interface 540.

In an embodiment, the parallel data interface 520 may acquire a user input signal inputted to the external device 590 through the second connector 512 of the serial data interface 510 during the second mode. According to various embodiments, the external device 590 may transmit, to the electronic device 400, key input data of a user inputted through the key board or touch input data of a user inputted through the touch pad, as the user input signal. The parallel data interface 520 may transmit the user input signal to the receiver 541 of the UART interface 540 by using the B port 522 which is in the active state among the plurality of ports. The UART interface 540 may transmit the user input signal to the controller 550 by using the receiver 541. The controller 550 may output information related to the user input signal on the display 410. For example, the controller 550 may convert the user input signal into visual information that may be understood by the user, and may display the visual information on the display 410. In another example, the controller 550 may convert the user input signal into auditory information or a vibration signal, and may output the same.

In an embodiment, the controller 550 may determine that updating for the external device 590 should be performed, and may set (change) the operation mode of the parallel data interface 520 to a third mode for transmitting data to the external device 590. For example, the controller 550 may detect an event related to updating of firmware of an MCU chip or an internal circuit of the external device 590, or may determine that the updating should be performed based on a user request. When the operation mode of the parallel data interface 520 is changed to the third mode, the controller 550 may set only a C port 523 among the plurality of GPIO ports included in the parallel data interface 520 to go into an active state, and may set the other ports 521, 522 to go into an inactive state. For example, the controller 550 may set the active state by controlling the C port 523 to go into a pull-up or pull-down state. In another example, the controller 550 may set the inactive state by controlling the other ports 521, 522 to go into a physically open circuit state. The controller 550 may control the C port 523 of the parallel data interface 520 which is set to be in the active state to be connected with a transmitter 542 of the UART interface 540. According to various embodiments, the controller 550 may acquire information related to updating of the external device 590 from an external server while the parallel data interface 520 is set to be in the third mode. For example, the information related to the updating may be information for updating firmware of an MCU chip or an internal chip included in the external device 590. The controller 550 may convert the information related to the updating into a signal of a binary format, and may transmit the signal to the transmitter 542 of the UART interface 540. The UART interface 540 may transmit the information related to the updating to the C port 523 of the parallel data interface 520 by using the transmitter 542. The information related to the updating may be transmitted to the external device 590 in a serial data format through the second connector of the serial data interface 510.

According to various embodiments, the configurations of the electronic device 400 shown in FIG. 5 may be implemented on a physical layer of 7 layers of open system interconnection (OSI).

Figure 6:
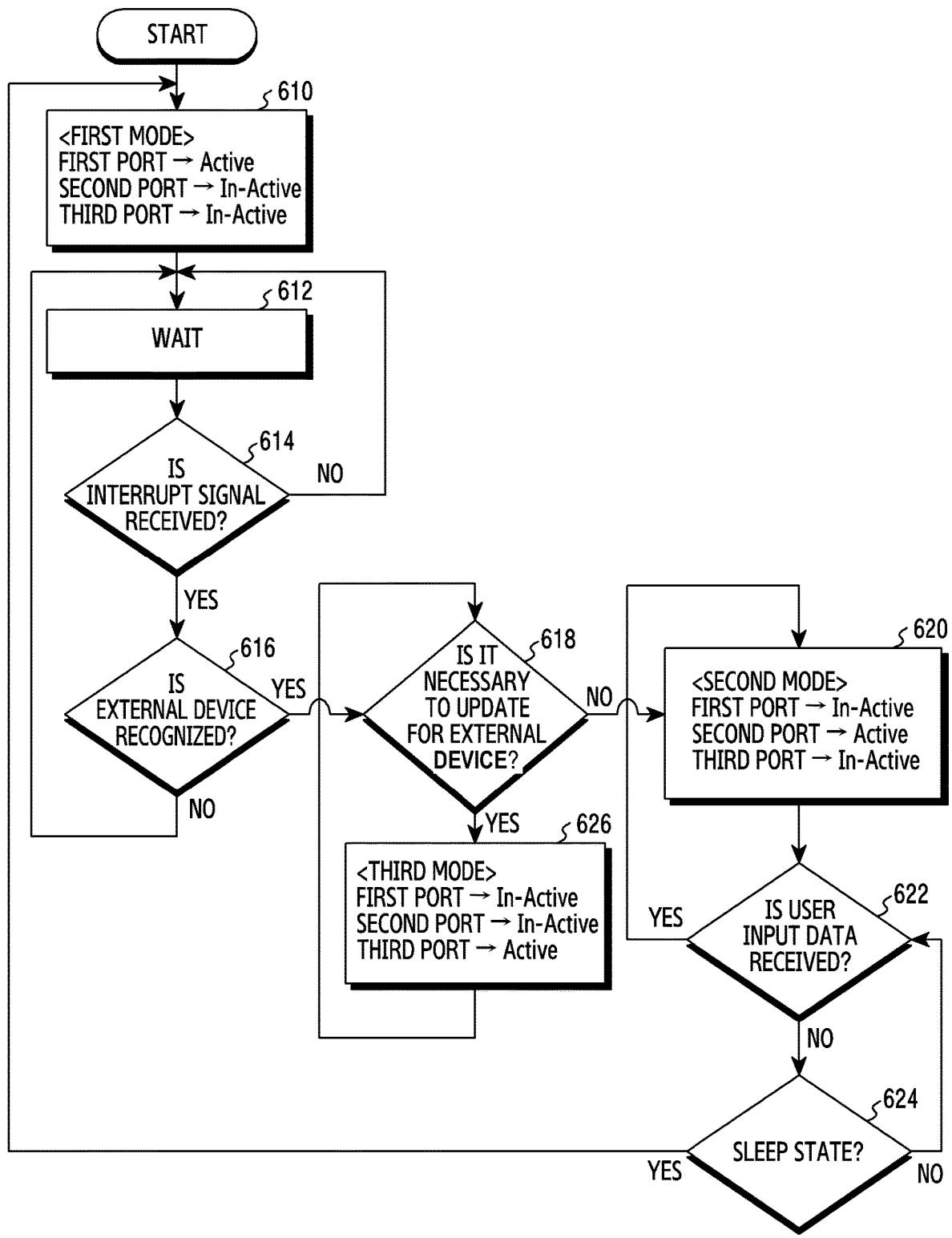
FIG. 6 is a view to explain an operation mode set for processing data in an electronic device according to an embodiment of the disclosure.

FIG. 6 is a view to explain an operation mode which is set to process data in the electronic device according to an embodiment of the disclosure.

According to various embodiments, the electronic device 400 may allocate a plurality of input/output ports (for example, the parallel data interface 520 of FIG. 5) for processing serial data of a data interface connectable with an external device in parallel. The data interface may correspond to the first data interface circuit 420 shown in FIG. 4, or the serial data interface 510 shown in FIG. 5. Operations shown in FIG. 6 may be understood as operations performed by the at least one processor 430 of FIG. 4 or the application processor 500 of FIG. 5.

In an embodiment, the electronic device 400 may set an operation mode for the plurality of input/output ports by considering an interlocking state with an external device (for example, the electronic device 102, 104 of FIG. 1, the external device 250 of FIG. 2A, or the external device 590 of FIG. 5). The operation mode may be divided according to which port of the plurality of input/output ports is in an active state.

According to various embodiments, the plurality of input/output ports may correspond to a plurality of GPIO ports, respectively, as shown in table 1. When each port is GPIO Input, each port may be set to a pull-up state, a pull-down state, or a no-pull state. When each port included in the plurality of input/output ports is set to be in the pull-up or pull-down state when operating as GPIO Input, the electronic device 400 may identify that the corresponding port is in an active state. When each port is set to be in the no-pull state when operating as GPIO Input (or in a physically open circuit state (high-z state)), the electronic device 400 may identify that the corresponding port is in an inactive state. When each port is GPIO Output, each port may be controlled to output a high or low value.

TABLE 1

| Classification | GPIO Input | | GPIO Output |
|---|---|---|---|
| GPIO #A | pull-up/pull-down/no pull | Interrupt | high/low |
| GPIO #B | pull-up/pull-down/no pull | UART Rx | high/low |
| GPIO #C | pull-up/pull-down/no pull | UART Tx | high/low |

According to an embodiment, in operation 610, the electronic device 400 may set an operation mode of the plurality of input/output ports to a first mode. For example, when the external device 590 is not mounted, the electronic device 400 may set the first mode as shown in FIG. 7.

Figure 7:
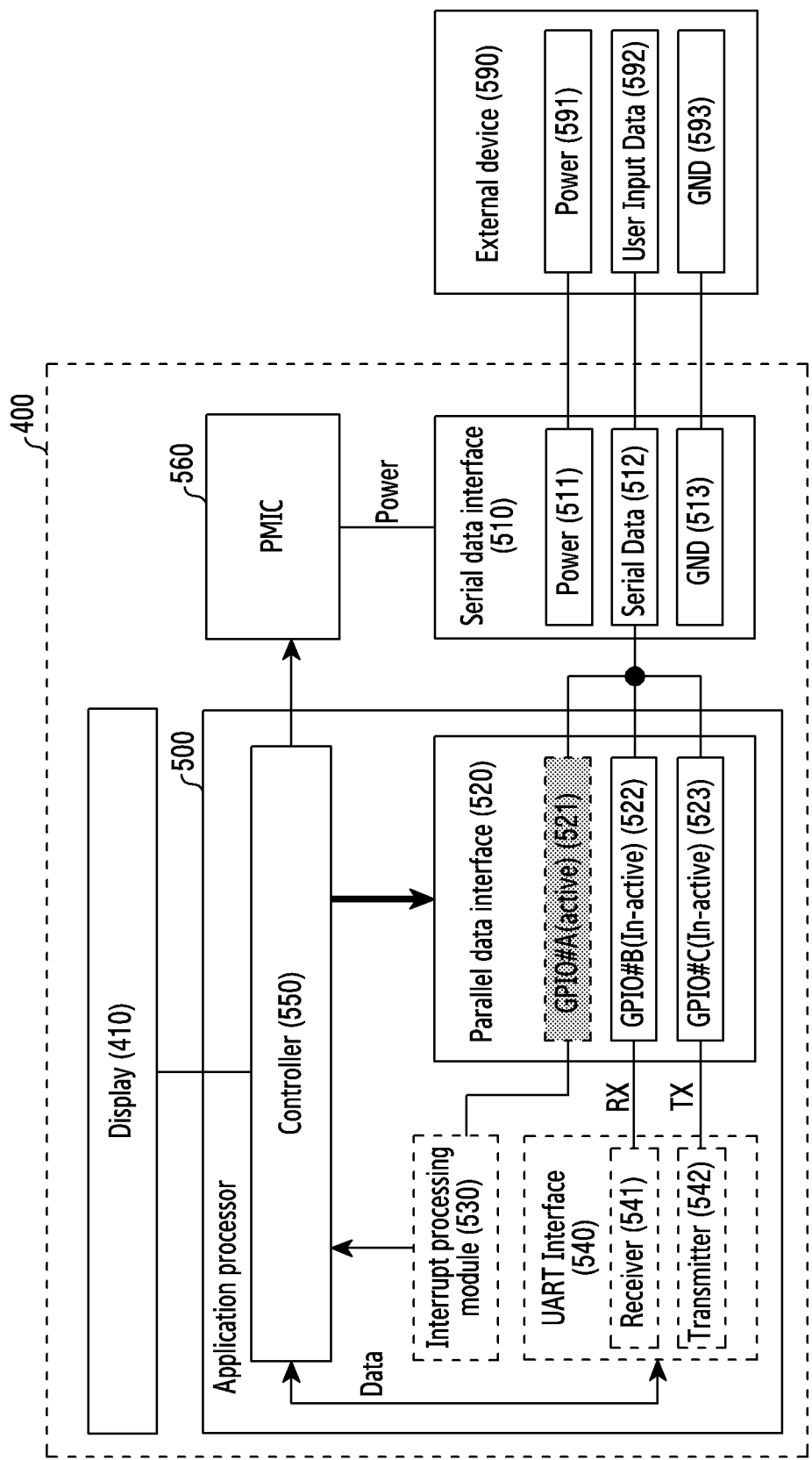
FIG. 7 is a view to explain a setting state of an electronic device when the electronic device is not connected with an external device according to an embodiment of the disclosure.

FIG. 7 is a view to explain a setting state of an electronic device when the electronic device is not connected with an external device according to an embodiment of the disclosure.

Referring to FIG. 7, an electronic device 400 may set the A port 521 to go into an active state by controlling the A port 521 among the plurality of GPIO ports included in a parallel data interface 520 to go into the pull-up or pull-down state. The electronic device 400 may set the other ports 522, 523 to go into an inactive state by controlling the other ports 522, 523 except for the A port 521 among the plurality of GPIO ports to go into an open circuit state.

According to an embodiment, in operation 612, the electronic device 400 may wait for connection with the external device 590 according to setting of the first mode.

According to an embodiment, in operation 614, the electronic device 400 may determine whether an interrupt signal is received from the external device 590. According to various embodiments, when being connected with the electronic device 400, the external device 590 may artificially generate an interrupt signal, or may transmit data initially inputted from a user when being connected to the electronic device 400 to the electronic device 400 as an interrupt signal. When it is identified that the interrupt signal is not received from the external device 590 as a result of identifying in operation 614—No, the electronic device 400 may resume operation 612 to continuously wait for reception of an interrupt signal. When it is identified that the interrupt signal is received from the external device 590 as a result of identifying in operation 614—Yes, the electronic device 400 may determine whether connection with the external device 590 is recognized in operation 616.

When the connection with the external device is not recognized as a result of identifying in operation 616—No, the electronic device 400 may resume operation 612 to continuously wait for reception of an interrupt signal.

Figure 8:
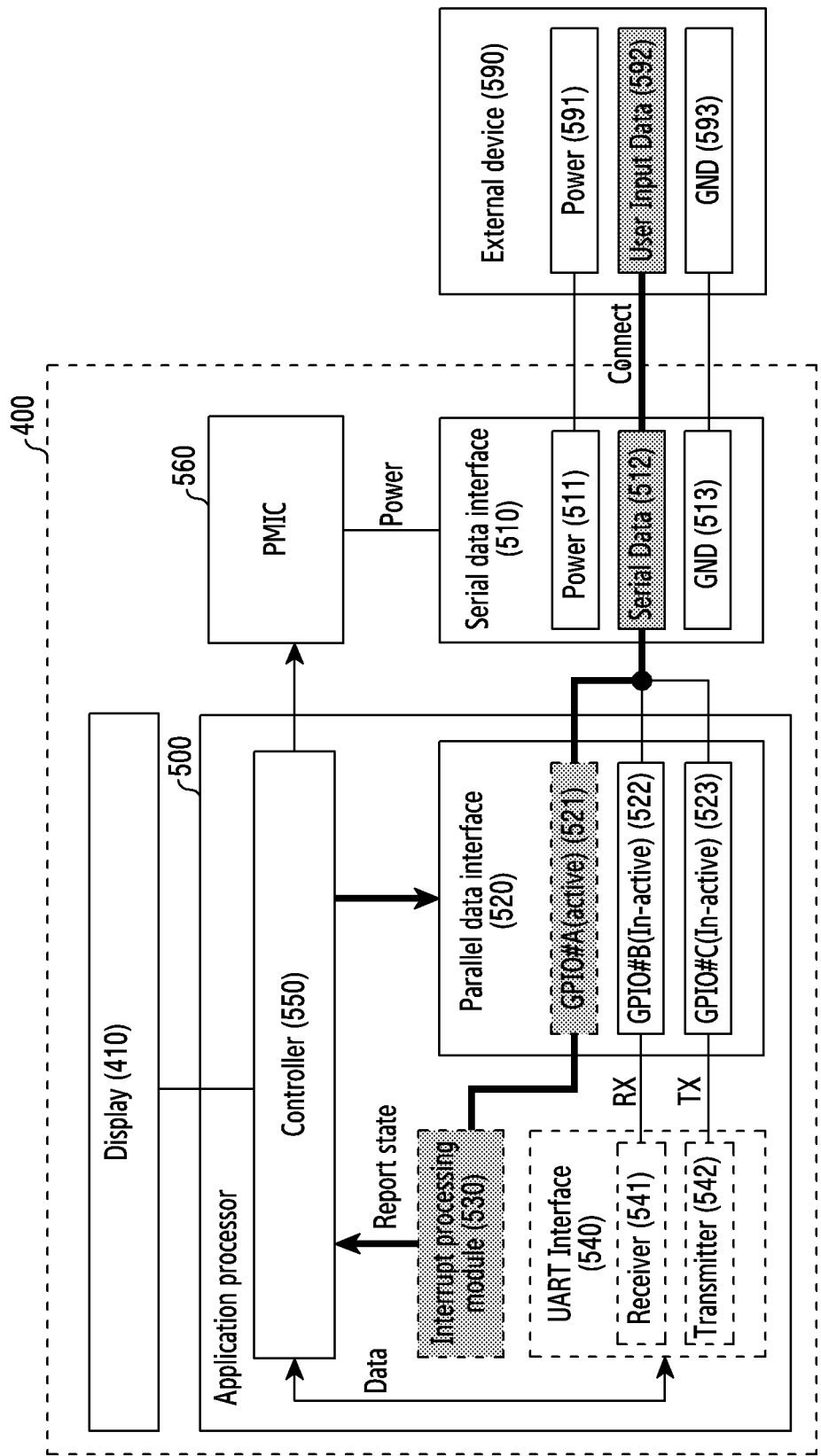
FIG. 8 is a view to explain a setting state of an electronic device when the electronic device is connected with an external device according to an embodiment of the disclosure.

When the connection with the external device 590 is recognized as a result of identifying in operation 616—Yes, the electronic device 400 may process the interrupt signal as shown in FIG. 8.

FIG. 8 is a view to explain a setting state of an electronic device when the electronic device is connected with an external device according to an embodiment of the disclosure.

Referring to FIG. 8, an electronic device 400 may transmit an interrupt signal to an interrupt processing module 530 by using A port 521 which is in an active state among a plurality of ports included in a parallel data interface 520. The interrupt processing module 530 may transmit first information indicating connection with the external device 590 based on the interrupt signal (or information indicating that an initial input occurs after be connected with the external device 590) to the controller 550. The controller 550 may recognize that the electronic device is connected with the external device 590, based on the first information, and may display information related to the connection on the display 410.

According to an embodiment, in operation 618, the electronic device 400 may identify whether it is necessary to update for the external device 590 in which connection is successfully set. According to various embodiments, the electronic device 400 may identify whether updating of firmware of an MCU chip or an internal circuit included in the external device 590 occurs, and may acquire information related to updating from an external application server (for example, the server 108 of FIG. 1) associated with the external device 590. When it is identified that it is not necessary to update for the external device 590 as a result of identifying in operation 618—No, the electronic device 400 may change the operation mode of the plurality of input/output ports to a second mode in operation 620.

Figure 9:
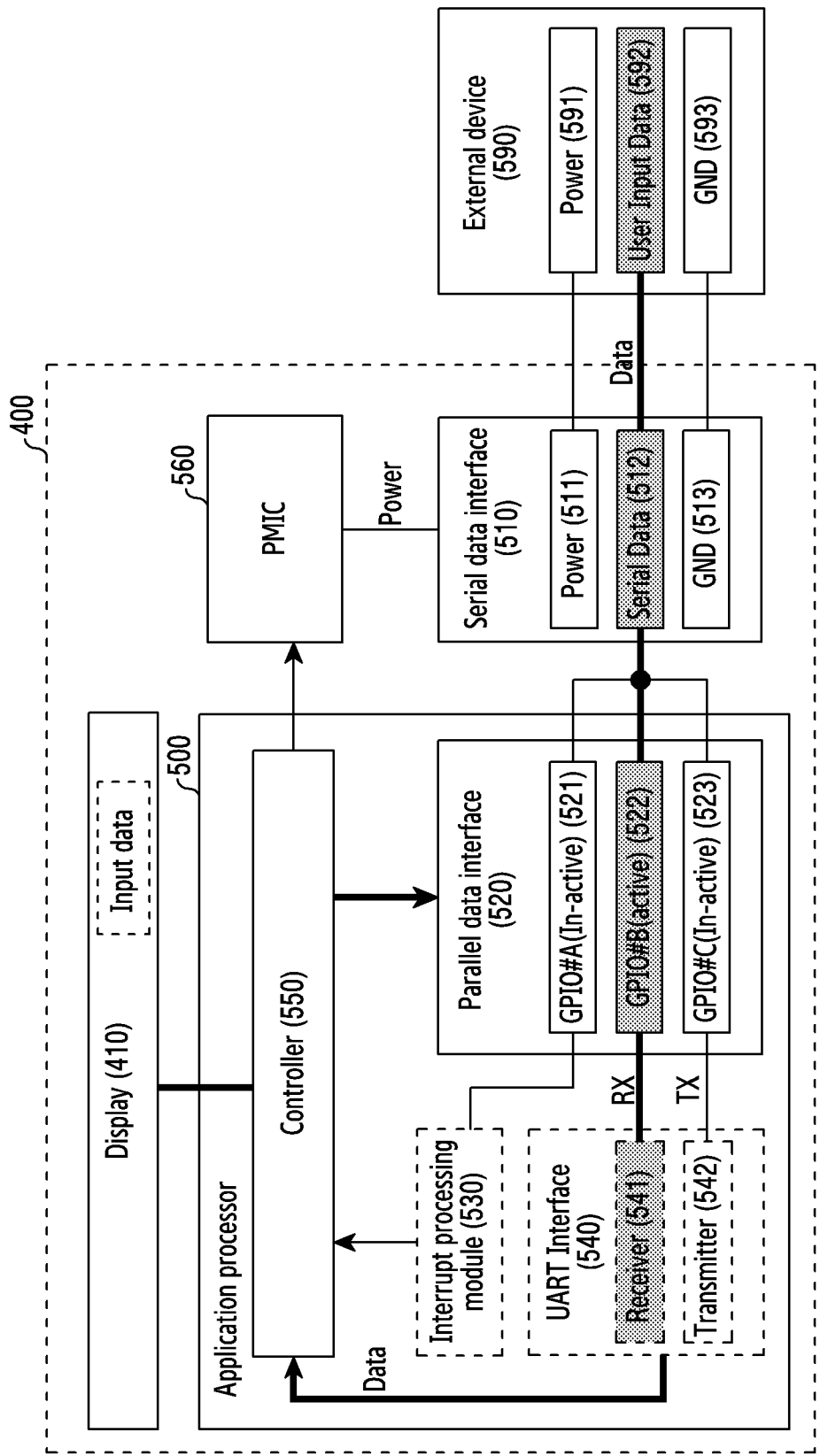
FIG. 9 is a view to explain a setting state of an electronic device for receiving data from an external device according to an embodiment of the disclosure.

For example, when it is not necessary to update for the external device 590, the electronic device 400 may set the second mode as shown in FIG. 9.

FIG. 9 is a view to explain a setting state of an electronic device for receiving data from an external device according to an embodiment of the disclosure.

Referring to FIG. 9, an electronic device 400 may set a B port 522 to go into an active state by controlling a B port 522 among a plurality of GPIO ports included in a parallel data interface 520 to go into a pull-up or pull-down state. The electronic device 400 may set the other ports 521, 523 to go into an inactive state by controlling the other ports 521, 523 except for the B port 522 among the plurality of GPIO ports to go into an open circuit state. The electronic device 400 may control the B port 522 which is set to be in the active state to be connected with the receiver 541 of the UART interface 540.

According to an embodiment, in operation 622, the electronic device 400 may determine user input data inputted to the external device 590 is received during the second mode. According to various embodiments, the user input data may include key input data which is inputted through the keyboard of the external device 590 or touch input data of a user which is inputted through the touch pad of the external device 590. When the user input data is received in operation 622, the electronic device 400 may process the user input data as shown in FIG. 9. Referring to FIG. 9, the electronic device 400 may transmit the user input data to the receiver 541 of the UART interface 540 by using the B port 522 which is in the active state among the plurality of ports included in the parallel data interface 520. The UART interface 540 may transmit the user input data to the controller 550 by using the receiver 541. The controller 550 may output information corresponding to the user input data on the display 410. The controller 550 may convert the user input data into visual information that may be understood by the user, and may display the visual information on the display 410.

According to an embodiment, in operation 624, the electronic device 400 may determine whether the electronic device goes into a sleep state. According to various embodiments, the electronic device 400 may determine that the electronic device goes into the sleep state when a designated time is elapsed after receiving a signal from the external device 590. When the electronic device 400 does not go into the sleep state as a result of determining in operation 624—No, the electronic device 400 may resume operation 622 to continuously wait for reception of user input data from the external device 590. When it is identified that the electronic device 400 goes into the sleep state as a result of determining in operation 624—Yes, the electronic device 400 may return to the initial state to set the parallel data interface 520 to go into the first mode.

According to an embodiment, when it is identified that it is necessary to update for the external device 590 as a result of identifying in operation 618 (operation 618—Yes), the electronic device 400 may change the operation mode of the plurality of input/output ports to a third mode in operation 626.

Figure 10:
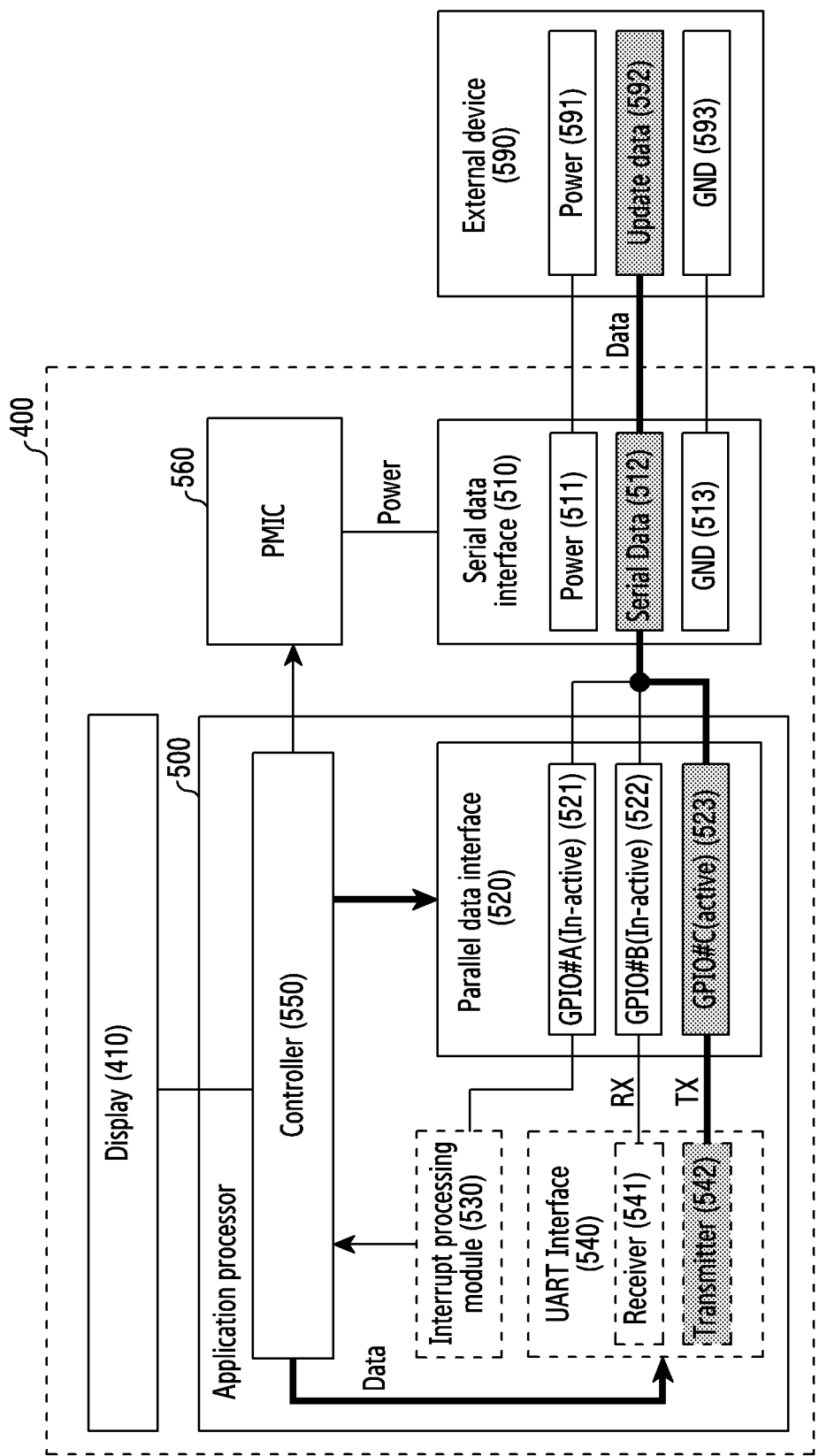
FIG. 10 is a view to explain a setting state of an electronic device for transmitting data to an external device according to an embodiment of the disclosure.

For example, when it is necessary to update for the external device 590, the electronic device 400 may set the third mode as shown in FIG. 10.

FIG. 10 is a view to explain a setting state of an electronic device for transmitting data to an external device according to an embodiment of the disclosure.

Referring to FIG. 10, an electronic device 400 may set a C port 523 to go into an active state by controlling the C port 523 among a plurality of GPIO ports included in a parallel data interface 520 to go into a pull-up or pull-down state. The electronic device 400 may set the other ports 521, 522 to go into an inactive state by controlling the other ports 521, 522 except for the C port 523 among the plurality of GPIO ports to go into an open circuit state. The electronic device 400 may control the C port 523 which is set to be in the active state to be connected with the transmitter 542 of the UART interface 540. While the parallel data interface 520 is in the third mode, the electronic device 400 may acquire information related to updating of the external device 590 from an external application server. The controller 550 may convert the information related to the updating into a signal of a binary format, and may transmit the signal to the transmitter 542 of the UART interface 540. The UART interface 540 may transmit the information related to the updating to the C port 523 of the parallel data interface 520 by using the transmitter 542. The information related to the updating may be transmitted to the external device 590 in a serial data format through the second connector of the serial data interface 510.

Figure 11:
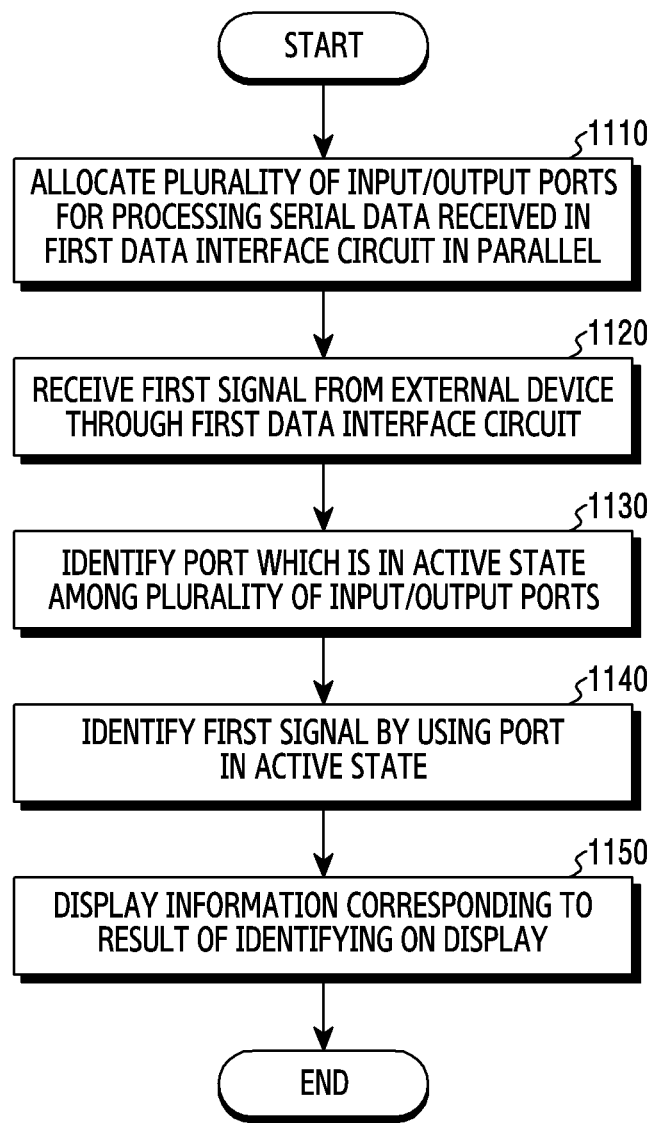
FIG. 11 is a flowchart illustrating an operating method of an electronic device according to an embodiment of the disclosure.

FIG. 11 is a flowchart illustrating an operating method of an electronic device according to an embodiment of the disclosure.

According to an embodiment, the electronic device 400 may be a device that is connected with an external device (for example, the electronic device 102, 104 of FIG. 1, the external device 250 of FIG. 2A, or the external device 590 of FIG. 5) and processes input/output data, and may correspond to the electronic device 101 shown in FIG. 1, the electronic device 200 shown in FIGS. 2A and 2B, or the electronic device 400 shown in FIG. 4. Operations of FIG. 11 may be performed by the at least one processor (for example, the processor 120 of FIG. 1 or the at least one processor 430 of FIG. 4) included in the electronic device 400.

Referring to FIG. 11, in operation 1110, an electronic device 400 may allocate a plurality of input/output ports (for example, GPIO ports 521, 522, 523 of FIG. 5) for processing serial data acquired in a first data interface circuit (for example, a first data interface circuit 420 of FIG. 4 or a serial data interface 510 of FIG. 5) in parallel. According to various embodiments, the first data interface circuit 420 may include a port for connecting to an external device, and may exchange serial data with the external device.

According to an embodiment, in operation 1120, the electronic device 400 may receive a first signal from the external device through the first data interface circuit 420. According to various embodiments, the first data interface circuit 420 may be an interface of a POGO type, and may include a first connector for supplying power, a second connector for processing data, or a third connector for grounding. When the external device connects through the first data interface circuit 420, the electronic device 400 may receive the first signal by using the second connector among the pogo pin connectors included in the first data interface circuit 420.

According to an embodiment, in operation 1130, the electronic device 400 may identify a port that is set to be in an active state among the plurality of input/output ports. According to various embodiments, the plurality of input/output ports may be of a GPIO pin type, such that a data input or output operation is controlled according to a design purpose.

According to an embodiment, in operation 1140, the electronic device 400 may identify the first signal by using the port that is identified as being in the active state. For example, when a first port for interrupt-processing among the plurality of input/output ports is identified as being in the active state, the electronic device 400 may identify that the first signal is an interrupt signal generated in the external device. When it is identified that the first signal is the interrupt signal, the electronic device 400 may recognize that the external device is connected, and may change a state set for the plurality of input/output ports. Instead of changing the first port to go into an inactive state, the electronic device 400 may set a second port for receiving data among the plurality of input/output ports to go into an active state. In another example, when it is identified that the second port for receiving data among the plurality of input/output ports is in the active state, the electronic device 400 may identify that the first signal is an input signal inputted to the external device by a user. The input signal may include at least one of key input data which is inputted by using a keyboard of the external device, or touch data which is inputted by using a touch pad of the external device. The electronic device 400 may process the first signal by using a UART interface (for example, the UART interface 540 of FIG. 5). In this case, the electronic device 400 may process the first signal by using a receiver of the UART. The electronic device 400 may identify input data of the user from the first signal, and may convert the input data into information of a form that may be provided to the user (for example, visual, auditory, or tactile information).

According to various embodiments, when it is identified that a signal is not received from the external device for a designated time while the second port is set to be in the active state, the electronic device 400 may change the second port to go into an inactive state, and may set the first port to go into an active state.

According to an embodiment, in operation 1150, the electronic device 400 may display information corresponding to a result of identifying the first signal on a display (for example, the display module 160 of FIG. 1 or the display 410 of FIG. 4). For example, when the first signal is identified as an interrupt signal generated in the external device, the electronic device 400 may display information indicating connection with the external device on the display 410. In another example, when the first signal is identified as an input signal inputted to the external device by the user, the electronic device 400 may display information corresponding to input data (for example, key input data of the keyboard or touch input data of the touch pad) included in the input signal on the display 410. According to various embodiments, the electronic device 400 may provide the information to the user by using at least one output of a speaker (for example, the sound output module 155 of FIG. 1) or a vibration generation module (for example, the haptic module 179 of FIG. 1).

According to various embodiments, the electronic device 400 may identify whether it is necessary to update for the external device. For example, the electronic device 400 may detect an event for updating firmware of an MCU chip or an internal circuit included in the external device, or may identify whether information related to the updating occurs at designated intervals. In another example, the electronic device 400 may determine whether to update for the external device, based on a user request. When it is identified that it is necessary to update for the external device, the electronic device 400 may change a port that is currently set to be in an active state to be in an inactive state, and may set a third port for transmitting data among the plurality of input/output ports to go into an active state. According to various embodiments, the electronic device 400 may process information related to updating of the external device by using a UART interface. In this case, the electronic device 400 may transmit the information related to the updating of the external device to the third port in the active state by using a transmitter of the UART. The electronic device 400 may transmit the information related to the updating to the first data interface circuit 420 by using the third port, and may transmit the information related to the updating to the external device through the first data interface circuit 420. According to various embodiments, when it is identified that it is not necessary to update for the external device, the electronic device 400 may control to maintain the active state of the second port.

According to an embodiment, an electronic device (for example, the electronic device 400) may include: a display (for example, the display 410); a first data interface circuit (for example, the first data interface circuit 420) including a port for connecting with an external device, and configured to exchange serial data with the external device; at least one processor (for example, the processor 430) operatively connected with the first data interface circuit; and a memory (for example, the memory 440) operatively connected with the at least one processor, and, when being executed, the memory stores instructions that cause the at least one processor to: allocate a plurality of input/output ports (e.g., GPIOs) for processing serial data received from the first data interface circuit in parallel, and receive a first signal from the external device through the first data interface circuit; in response to the first signal being received, identify a port that is set to be in an active state among the plurality of input/output ports; identify the first signal by using the port that is identified as being in the active state; and display information corresponding to a result of the identifying on the display.

In an embodiment, the instructions may cause the at least one processor to: when a first port for interrupt-processing among the plurality of input/output ports is identified as being in the active state, identify the first signal as an interrupt signal from the external device; and recognize connection with the external device based on the first signal.

In an embodiment, the instructions may cause the at least one processor to control the display to display information related to connection with the external device on the display.

In an embodiment, the instructions may cause the at least one processor to, in response to the connection with the external device being recognized, change the first port among the plurality of input/output ports to go into an inactive state, and to set a second port for receiving data among the plurality of input/output ports to go into an active state.

In an embodiment, the instructions may cause the at least one processor to, when a second port for receiving data among the plurality of input/output ports is identified as being in an active state, identify that the first signal is an input signal from the external device.

In an embodiment, the instruction may cause the at least one processor to control the display to display input data included in the first signal on the display.

In an embodiment, the instructions may cause the at least one processor to, when it is identified that a signal is not received from the external device for a designated time, change the second port among the plurality of input/output ports to go into an inactive state, and to set a first port for interrupt-processing among the plurality of input/output ports to go into an active state.

In an embodiment, the instructions may cause the at least one processor to: identify whether it is necessary to update for the external device; when it is necessary to update for the external device as a result of the identifying, set a third port for transmitting data among the plurality of input/output ports to go into an active state; transmit information related to the updating to the first data interface circuit by using the third port; and transmit the information related to the updating from the first data interface circuit to the external device.

In an embodiment, the instructions may cause the at least one processor to, when it is not necessary to update for the external device as a result of the identifying, set a second port for receiving data among the plurality of input/output ports to go into an active state.

In an embodiment, the first data interface circuit may include one or more pogo pin connectors.

According to another embodiment, an operating method of an electronic device (for example, the electronic device 400) may include: allocating a plurality of input/output ports (e.g., GPIOs) for processing serial data acquired from a first data interface circuit in parallel, and receiving a first signal from an external device through the first data interface circuit; in response to the first signal being received, identifying a port that is set to be in an active state among the plurality of input/output ports; identifying the first signal by using the port that is identified as being in the active state; and displaying information corresponding to a result of the identifying on a display.

In an embodiment, identifying the first signal may include: when a first port for interrupt-processing among the plurality of input/output ports is identified as being in the active state, identifying the first signal as an interrupt signal from the external device; and recognizing connection with the external device based on the first signal.

In an embodiment, displaying the information corresponding to the result of the identifying on the display may include displaying information related to connection with the external device on the display.

In an embodiment, the method may further include, in response to the connection with the external device being recognized, changing the first port among the plurality of input/output ports to go into an inactive state, and setting a second port for receiving data among the plurality of input/output ports to go into an active state.

In an embodiment, identifying the first signal may include, when a second port for receiving data among the plurality of input/output ports is identified as being in an active state, identifying that the first signal is an input signal from the external device.

In an embodiment, displaying the information corresponding to the result of the identifying on the display may include displaying input data included in the first signal on the display.

In an embodiment, the method may further include, when it is identified that a signal is not received from the external device for a designated time, changing the second port among the plurality of input/output ports to go into an inactive state, and setting a first port for interrupt-processing among the plurality of input/output ports to go into an active state.

In an embodiment, the method may further include: identifying whether it is necessary to update for the external device; when it is necessary to update for the external device as a result of the identifying, setting a third port for transmitting data among the plurality of input/output ports to go into an active state; transmitting information related to the updating to the first data interface circuit by using the third port; and transmitting the information related to the updating from the first data interface circuit to the external device.

In an embodiment, the method may further include, when it is not necessary to update for the external device as a result of the identifying, setting a second port for receiving data among the plurality of input/output ports to go into an active state.

In an embodiment, the first data interface circuit may include one or more pogo pin connectors.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display;
    a first data interface circuit comprising a port for connecting with an external device, and a single 1-wire communication interface configured to exchange bi-directional serial data with the external device;
    at least one processor; and
    memory storing instructions that, when executed by the at least one processor, cause the electronic device to:
        allocate a plurality of input/output ports for processing serial data received from the single 1-wire communication interface of the first data interface circuit in parallel, and receive a first signal from the external device through the single bi-directional 1-wire communication interface of the first data interface circuit,
        in response to the first signal being received, identify a port that is set to be in an active state among the plurality of input/output ports,
        identify a type of the first signal by using the port that is identified as being in the active state, and
        display information corresponding to a result of the identifying on the display,
        wherein to identify the port that is in the active state, the instructions, when executed by the at least one processor, further cause the electronic device to identify the port being in a pull-up state or a pull-down state from among the plurality of input/output ports.

2. The electronic device of claim 1, wherein the instructions, when executed by the at least one processor, further cause the electronic device to:
    in response to a first port for interrupt-processing among the plurality of input/output ports being identified as being in the active state, identify the first signal as an interrupt signal from the external device; and
    recognize connection with the external device based on the first signal.

3. The electronic device of claim 2, wherein the instructions, when executed by the at least one processor, further cause the electronic device to control the display to display information related to connection with the external device on the display.

4. The electronic device of claim 2, wherein the instructions, when executed by the at least one processor, further cause the electronic device to:
    in response to the connection with the external device being recognized, change the first port among the plurality of input/output ports to go into an inactive state; and
    set a second port for receiving data among the plurality of input/output ports to go into an active state.

5. The electronic device of claim 1, wherein the instructions, when executed by the at least one processor, further cause the electronic device to, in response to a second port for receiving data among the plurality of input/output ports being identified as being in an active state, identify that the first signal is an input signal from the external device.

6. The electronic device of claim 5, wherein the instructions, when executed by the at least one processor, further cause the electronic device to control the display to display input data included in the first signal on the display.

7. The electronic device of claim 5, wherein the instructions, when executed by the at least one processor, further cause the electronic device to:
    in response to an identification that a signal is not received from the external device for a designated time, change the second port among the plurality of input/output ports to go into an inactive state; and
    set a first port for interrupt-processing among the plurality of input/output ports to go into an active state.

8. The electronic device of claim 1, wherein the instructions, when executed by the at least one processor, further cause the electronic device to:
    identify whether it is necessary to update the external device;
    in response to it being necessary to update the external device as a result of the identification of the necessity, set a third port for transmitting data among the plurality of input/output ports to go into an active state;
    transmit information related to the updating to the first data interface circuit by using the third port; and
    transmit the information related to the updating from the first data interface circuit to the external device.

9. The electronic device of claim 8, wherein the instructions, when executed by the at least one processor, further cause the electronic device to, in response to it not being necessary to update the external device as a result of the identification of the lack of necessity, set a second port for receiving data among the plurality of input/output ports to go into an active state.

10. The electronic device of claim 1, wherein the first data interface circuit comprises one or more pogo pin connectors.

11. A method of operating an electronic device, the method comprising:
    allocating a plurality of input/output ports for processing serial data acquired from a single bi-directional 1-wire communication interface of a first data interface circuit in parallel, and receiving a first signal from an external device through the first data interface circuit;
    in response to the first signal being received via the single bi-directional 1-wire communication interface, identifying a port that is set to be in an active state among the plurality of input/output ports;
    identifying a type of the first signal by using the port that is identified as being in the active state; and
    displaying information corresponding to a result of the identifying on a display,
    wherein the identifying of the port that is in the active state comprises identifying the port being in a pull-up state or a pull-down state from among the plurality of input/output ports.

12. The method of claim 11, wherein identifying the first signal comprises:
    in response to a first port for interrupt-processing among the plurality of input/output ports being identified as being in the active state, identifying the first signal as an interrupt signal from the external device; and
recognizing connection with the external device based on the first signal.

13. The method of claim 12, wherein displaying the information, corresponding to the result of the identification of the first signal, on the display comprises displaying information related to connection with the external device on the display.

14. The method of claim 12, further comprising, in response to the connection with the external device being recognized, changing the first port among the plurality of input/output ports to go into an inactive state, and setting a second port for receiving data among the plurality of input/output ports to go into an active state.

15. The method of claim 11, wherein identifying the first signal comprises, in response to a second port for receiving data among the plurality of input/output ports being identified as being in an active state, identifying that the first signal is an input signal from the external device.

16. The method of claim 15, wherein displaying the information, corresponding to the result of the identification of the first signal, on the display comprises displaying input data included in the first signal on the display.

17. The method of claim 15, further comprising, in response to it being identified that a signal is not received from the external device for a designated time, changing the second port among the plurality of input/output ports to go into an inactive state, and setting a first port for interrupt-processing among the plurality of input/output ports to go into an active state.

18. The method of claim 11, further comprising:
identifying whether it is necessary to update the external device;
in response to it being necessary to update the external device as a result of the identifying, setting a third port for transmitting data among the plurality of input/output ports to go into an active state;
transmitting information related to the updating to the first data interface circuit by using the third port; and
transmitting the information related to the updating from the first data interface circuit to the external device.

19. The method of claim 18, further comprising, in response to it not being necessary to update the external device, as a result of the identifying, setting a second port for receiving data among the plurality of input/output ports to go into an active state.

20. The method of claim 11, wherein the first data interface circuit comprises one or more pogo pin connectors.

21. The electronic device of claim 1, wherein the identifying of the type of the first signal by using the port that is identified as being in the active state comprises identifying the signal as at least one of:
an interrupt signal from the external device based on a first input/output port of the plurality of input/output ports being active, or
user input data from the external device based on a second input/output port of the plurality of input/output ports being active.

22. The method of claim 11, wherein the identifying of the port that in the active state is performed without a determination of a current timeslot.

* * * * *